United States Patent
Blatchley et al.

(10) Patent No.: US 10,486,498 B2
(45) Date of Patent: Nov. 26, 2019

(54) METHOD AND SYSTEM FOR OPERATING A HEAT PUMP OF A VEHICLE

(71) Applicant: Ford Global Technologies, LLC, Dearborn, MI (US)

(72) Inventors: Timothy Noah Blatchley, Dearborn, MI (US); James George Gebbie, Rochester Hills, MI (US); Clay Wesley Maranville, Ypsilanti, MI (US); Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 15/051,401

(22) Filed: Feb. 23, 2016

(65) Prior Publication Data

US 2017/0240024 A1   Aug. 24, 2017

(51) Int. Cl.
*B60H 1/32* (2006.01)
*B60H 1/00* (2006.01)

(52) U.S. Cl.
CPC ....... *B60H 1/3205* (2013.01); *B60H 1/00007* (2013.01); *B60H 1/00921* (2013.01); *B60H 1/3213* (2013.01); *B60H 2001/00957* (2013.01); *B60H 2001/325* (2013.01); *B60H 2001/3238* (2013.01); *B60H 2001/3272* (2013.01)

(58) Field of Classification Search
CPC .......... B60H 1/00278; F25B 2600/025; F25B 2600/0271; F25B 2600/0272; F25B 49/025; F25B 2700/1931; F25B 2700/1933

USPC .............................................. 62/228.3, 228.4
See application file for complete search history.

(56) References Cited

U.S. PATENT DOCUMENTS

| | | | |
|---|---|---|---|
| 6,276,153 B1 | 8/2001 | Skupin et al. | |
| 2001/0052238 A1 | 12/2001 | Burk et al. | |
| 2002/0148244 A1 | 10/2002 | Heyl | |
| 2003/0213256 A1* | 11/2003 | Ueda | F25B 1/02 62/230 |
| 2010/0218527 A1* | 9/2010 | Kitagishi | F24F 11/008 62/228.5 |
| 2015/0052913 A1 | 2/2015 | Smith et al. | |
| 2015/0295285 A1* | 10/2015 | Takeuchi | F25B 5/00 62/498 |

OTHER PUBLICATIONS

Control Station, PI Control, 2007.*

* cited by examiner

*Primary Examiner* — Christopher R Zerphey
*Assistant Examiner* — Schyler S Sanks
(74) *Attorney, Agent, or Firm* — David Kelley; McCoy Russell LLP

(57) ABSTRACT

Methods and systems for providing control of a heat pump of a motor vehicle are presented. In one operating mode, speed of a heat pump compressor is controlled responsive to an outlet pressure of the heat pump compressor. In a second operating mode, speed of the heat pump compressor is controlled responsive to a pressure ratio between an inlet and an outlet of the heat pump compressor.

11 Claims, 10 Drawing Sheets

FIG. 3

HEATING MODE

METHOD AND SYSTEM FOR OPERATING A HEAT PUMP OF A VEHICLE

FIELD

The present description relates to methods and a system for providing climate control for a vehicle. The methods and system may be particularly useful for vehicles that are solely electrically propelled or vehicles that include hybrid powertrains.

BACKGROUND AND SUMMARY

A vehicle may include a heat pump to adjust environmental conditions of a vehicle's passenger compartment. The heat pump may operate in several different modes to control the vehicle cabin environment. For example, the heat pump may be operated in a heating mode where thermal energy is transferred from the heat pump to coolant that warms the vehicle cabin. The heat pump may be operated in a cooling mode where a heat exchanger in the vehicle's cabin operates as an evaporator to cool air that passes over the interior heat exchanger. The heat pump may also operate in a de-humidification mode where the heat pump cools passenger cabin air to remove humidity and then warms the air to heat the passenger cabin or defrost vehicle windows.

The ability to operate the heat pump in more than one mode increases the utility of the heat pump. However, operating the heat pump in more than one mode may make controlling the heat pump more challenging. In particular, it may be possible for the heat pump's compressor to flow less refrigerant and lubricant during some operating conditions of the heat pump's different operating modes. For example, compressor lubrication may be reduced due to high pressure ratios across the compressor when a heat pump is operated in a heating or dehumidification mode where an exterior heat exchanger operates as an evaporator and compressor inlet or suction pressure is driven by ambient temperature. The reduced flow of compressor lubricant may increase the possibility of heat pump compressor degradation. Therefore, it may be desirable to provide a way of operating the compressor in the different heat pump modes so that heat pump compressor lubrication may be ensured.

The inventors herein have recognized the above-mentioned disadvantage and have developed a vehicle system, comprising: a refrigerant loop including a compressor; a first pressure sensor; and a controller including executable instructions stored in non-transitory memory to adjust a speed of the compressor in response to a pressure ratio across an outlet of the compressor and an inlet of the compressor, the pressure ratio based at least in part on output of the first pressure sensor.

By controlling heat pump compressor speed in response to a pressure ratio between a heat pump compressor inlet and a heat pump compressor outlet, it may be possible to provide the technical result of reducing the possibility of heat pump compressor degradation. In particular, the possibility of heat pump compressor degradation may be reduced when the heat pump is operating in a heating mode or dehumidification mode where heat pump compressor inlet pressure may vary substantially. If the pressure ratio between the heat pump compressor inlet and outlet increases beyond a threshold, compressor speed may be reduced to increase refrigerant and lubrication flow through the compressor. As such, the possibility of compressor degradation may be reduced. If the pressure ratio increases sufficiently, the compressor may be stopped based on a recognition that compressor lubrication decreases as refrigerant and lubricant flow through the heat pump compressor decreases at higher pressure ratios across the compressor.

The present description may provide several advantages. For example, the approach may reduce the possibility of heat pump compressor degradation. Further, the approach may be provided without a significant increase in system cost. Further still, the approach may be applied to a variety of system configurations to provide similar functionality in a variety of different systems.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where:

FIGS. 2-4B show a vehicle climate control system for the vehicle of FIG. 1 operating in different modes;

DETAILED DESCRIPTION

Figure 1:
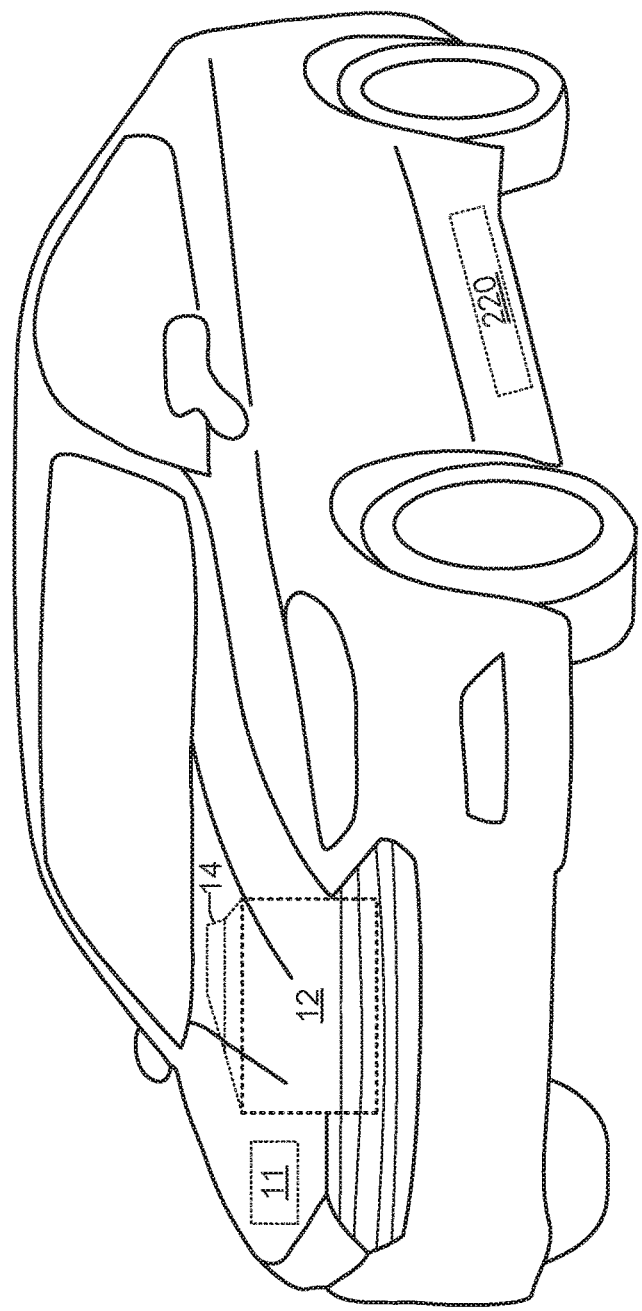
FIG. 1 is a schematic diagram of a vehicle.

The present description is related to operating a heat pump compressor for a climate control system of a vehicle. The vehicle climate control system may be included in an electric or hybrid vehicle as is shown in FIG. 1. The vehicle climate control system may include a heat pump and operating modes as described in FIGS. 2-4B. The heat pump may be may be operating according to the methods of FIGS. 5-9 to reduce the possibility of heat pump compressor degradation.

Referring to FIG. 1, a vehicle 10 including an engine 12, an electrical machine 14, a first electrical energy storage device 11, and a second electrical energy storage device 220 is shown. In one example, the vehicle may be propelled solely via the engine 12, solely via the electrical machine 14, or by both the engine 12 and the electrical machine 14. The electrical machine may be supplied electrical power via the second electrical energy storage device 220. The second electrical energy storage device 220 may be recharged via engine 12 providing power to electrical machine 14 and electrical machine outputting electrical energy to second electric energy storage device 220. Alternatively, electrical energy storage device may be recharged via converting the vehicle's kinetic energy into electrical energy via electrical machine 14 during vehicle deceleration or hill descent.

Second electrical energy storage device 220 may also be recharged from a stationary power grid via a home charging system or a remote charging system (e.g., a charging station). In one example, second electrical energy storage device 220 is a battery. Alternatively, second electrical energy storage device 220 may be a capacitor or other storage device. First electrical energy storage device 11 may be a low voltage battery for cranking the engine and operating vehicle electrical consumers (e.g., lights).

Figure 2:
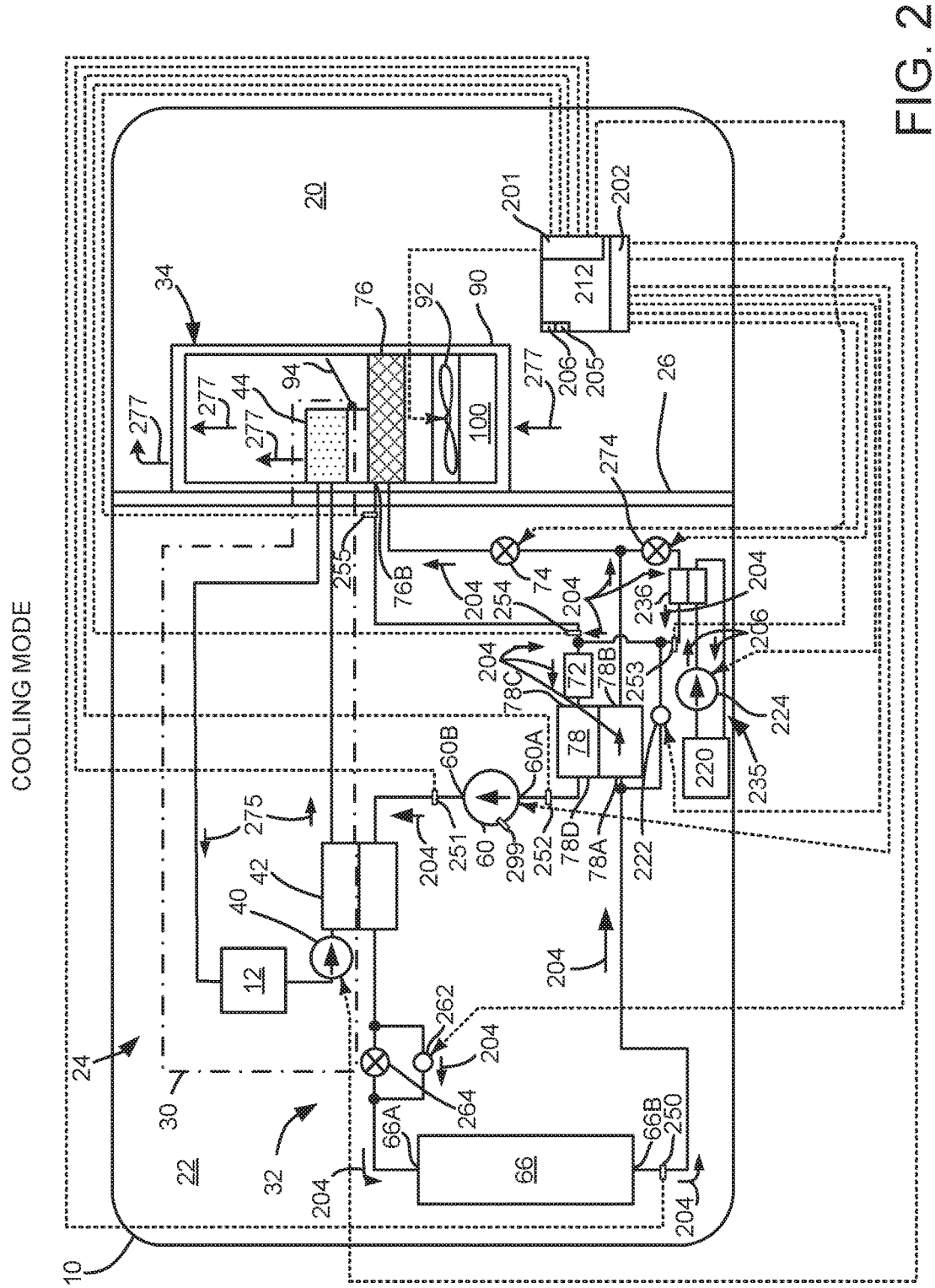

Referring to FIG. 2, a schematic representation of a vehicle 10 with a climate control system 24 is shown. Flow direction arrows (e.g., 204) describe refrigerant flow in climate control system 24 when climate control system 24 is operated in a cooling mode. The vehicle 10 may have any suitable drivetrain and may include an engine 12 that may be used to propel the vehicle 10 and/or power vehicle components. The vehicle 10 may include a single engine 12 as shown in FIG. 1 and it may be configured as an internal combustion engine adapted to combust any suitable type of fuel, such as gasoline, diesel fuel, or hydrogen. As another option, vehicle 10 may be configured as a hybrid vehicle that may have a plurality of power sources, such as a non-electrical power source like an engine and an electrical power source as is shown in FIG. 1. The vehicle 10 may include a passenger compartment 20, an engine compartment 22, and a climate control system 24.

Devices and fluidic passages or conduits are shown as solid lines in FIGS. 2-4B. Electrical connections are shown as dashed lines in FIGS. 2-4B. In FIGS. 2-4B, coolant subsystem 30 is shown with an engine 12, but in some examples engine 12 may be omitted.

The passenger compartment 20 may be disposed inside the vehicle 10 and may receive one or more occupants. A portion of the climate control system 24 may be disposed in the passenger compartment 20.

The engine compartment 22 may be disposed proximate the passenger compartment 20. An engine 12 and/or an electric machine 14 as well as a portion of the climate control system 24 may be disposed in the engine compartment 22. The engine compartment 22 may be separated from the passenger compartment 20 by a bulkhead 26.

An outlet side 60B of compressor 60 is directly coupled to an inlet side of intermediate heat exchanger 42 via a conduit. Controller 212 may supply current and voltage to adjust a speed of compressor 60. Compressor 60 may pressurize and circulate the refrigerant through the heat pump subsystem 32. The compressor 60 may be powered by an electrical power source. Speed of compressor 60 may be determined via sensor 299 which may be electrically coupled to controller 212.

Intermediate heat exchanger 42 may facilitate the transfer of thermal energy between the coolant subsystem 30 and the heat pump subsystem 32. In particular, heat may be transferred from heat pump subsystem 32 to coolant subsystem 30. The intermediate heat exchanger 42 may be part of the coolant subsystem 30 and the heat pump subsystem 32, and it may facilitate the transfer of thermal energy from heat pump subsystem 32 to coolant subsystem 30 without mixing or exchanging the heat transfer fluids in the coolant subsystem 30 and heat pump subsystems 32.

Intermediate heat exchanger 42 is shown directly coupled to an inlet side of first control valve 262 and an inlet side of first expansion device 264, which may be a fixed area expansion device. The first expansion device 264 may be provided to change the pressure of the refrigerant. For instance, the first expansion device 264 may be a fixed area expansion device or variable position valve that may or may not be externally controlled. The first expansion device 264 may reduce the pressure of the refrigerant that passes through the first expansion device 264 from the intermediate heat exchanger 42 to the exterior heat exchanger 66. As such, high pressure refrigerant received from the intermediate heat exchanger 42 may exit the first expansion device 64 at a lower pressure and as a liquid and vapor mixture in a heating mode.

First control valve 262 may be selectively opened and closed via controller 212. When first control valve 262 is in an open position, it provides a path of least fluidic resistance to exterior heat exchanger 66 such that there is little pressure drop across fixed area expansion device 264. Outlet sides of fixed area expansion device 264 and first control valve 262 are shown directly coupled to an inlet side 66A of exterior heat exchanger 66. An outlet side 66B of exterior heat exchanger 66 is shown directly coupled to a first inlet side 78A of internal heat exchanger 78 and coupled to an inlet side of accumulator 72 via second control valve 222. The exterior heat exchanger 66 may be disposed outside the passenger compartment 20. In a cooling mode or air conditioning context, the exterior heat exchanger 66 may function as a condenser and may transfer heat to the surrounding environment to condense the refrigerant from a vapor to liquid. In a heating mode, the exterior heat exchanger 66 may function as an evaporator and may transfer heat from the surrounding environment to the refrigerant, thereby causing the refrigerant to vaporize. A first outlet side 78B of internal heat exchanger 78 is directly coupled to inlets of second expansion device 74 and third expansion valve 274.

Internal heat exchanger 78, may transfer thermal energy between refrigerant flowing through different regions of the heat pump subsystem 32. Internal heat exchanger 78 may be disposed outside the passenger compartment 20. In a cooling mode or air conditioning context, heat may be transferred from refrigerant that is routed from the exterior heat exchanger 66 to the interior heat exchanger 76 to refrigerant that is routed from the accumulator 72 to the compressor 60. In the heating mode, the internal heat exchanger 78 does not transfer thermal energy between such refrigerant flow paths since the second expansion device 74 is closed, thereby inhibiting the flow of refrigerant through a portion of the internal heat exchanger 78.

The second expansion device 74 may be disposed between and may be in fluid communication with the exterior heat exchanger 66 and the interior heat exchanger 76. The second expansion device 74 may have a similar configuration as the first expansion device 264 and may be provided to change the pressure of the refrigerant similar to the first expansion device 264. In addition, the second expansion device 74 may be closed to inhibit the flow of refrigerant. More specifically, the second expansion device 74 may be closed to inhibit the flow of refrigerant from the exterior heat exchanger 66 to the interior heat exchanger 76 in a heating mode.

An outlet side of second expansion device 74 is directly coupled to an inlet side of interior heat exchanger 76. And outlet side 76B of interior heat exchanger 76 is directly coupled to an inlet of accumulator 72. The interior heat exchanger 76 may be in fluid communication with the second expansion device 74. The interior heat exchanger 76 may be disposed inside the passenger compartment 20. In a cooling mode or air conditioning context, the interior heat exchanger 76 may function as an evaporator and may receive heat from air in the passenger compartment 20 to vaporize the refrigerant. Refrigerant exiting the interior heat exchanger 76 is directly routed to the accumulator 72. In the heating mode, refrigerant may not be routed to the interior heat exchanger 76 due to the closure of the second expansion device 74.

An outlet of accumulator 72 is directly coupled to second inlet 78C of internal heat exchanger 78. The accumulator 72 may act as a reservoir for storing any residual liquid refrigerant so that vapor refrigerant rather than liquid refrigerant may be provided to the compressor 60. The accumulator 72 may include a desiccant that absorbs small amounts of water moisture from the refrigerant. A second outlet 78D of internal heat exchanger 78 is directly coupled to inlet or suction side 60A of compressor 60.

An outlet side of second control valve 222 is directly coupled to an inlet of accumulator 72 and an outlet of battery chiller heat exchanger 236. An outlet side of third expansion valve 274 is directly coupled to an inlet side of battery chiller heat exchanger 236. An outlet side of battery chiller heat exchanger 236 is directly coupled to an inlet side of accumulator 72. Third expansion valve 274 may be a TXV with shutoff, a fixed area expansion device, or an electronic expansion valve (EXV). In this example, battery chiller expansion device 274 and expansion device 74 include shut-off valves for preventing flow through the respective valves.

Battery chiller loop 235 includes second electrical energy storage device 220, battery chiller pump 224, and battery chiller heat exchanger 236. Heat from second electrical energy storage device 220 may be rejected to refrigerant flowing through battery chiller heat exchanger 236. Thus, coolant in battery chiller loop 235 is fluidically isolated from refrigerant in heat pump subsystem 32.

The climate control system 24 may circulate air and/or control or modify the temperature of air that is circulated in the passenger compartment 20. The climate control system 24 may include a coolant subsystem 30, a heat pump subsystem 32, and a ventilation subsystem 34. Coolant in coolant subsystem is fluidically isolated from refrigerant in heat pump subsystem 32.

The coolant subsystem 30, which may also be referred to as a coolant loop, may circulate a fluid, such as coolant, to cool the engine 12 or electric machine (not shown). For example, waste heat that is generated by the engine 12 when the engine is running or operational may be transferred to the coolant and then circulated to one or more heat exchangers to transfer thermal energy from the coolant. In at least one example, the coolant subsystem 30 may include a coolant pump 40, an intermediate heat exchanger 42 that may be fluidly interconnected by conduits such as tubes, hoses, pipes, or the like. The coolant subsystem 30 may also include a radiator (not shown) that may be disposed in the engine compartment 22 for transferring thermal energy to the ambient air surrounding the vehicle 10.

The coolant pump 40 may circulate coolant through the coolant subsystem 30. The coolant pump 40 may be powered by an electrical power source. The coolant pump 40 may receive coolant from the engine 12 and circulate the coolant in a closed loop. For instance, when the climate control system 24 is in a heating mode, coolant may be routed from the coolant pump 40 to the intermediate heat exchanger 42 and then to the heater core 44 before returning to the engine 12 as represented by the arrowed lines 275.

The intermediate heat exchanger 42 may facilitate the transfer of thermal energy between the coolant subsystem 30 and the heat pump subsystem 32. The intermediate heat exchanger 42 may be part of the coolant subsystem 30 and the heat pump subsystem 32. The intermediate heat exchanger 42 may have any suitable configuration. For instance, the intermediate heat exchanger 42 may have a plate-fin, tube-fin, or tube-and-shell configuration that may facilitate the transfer of thermal energy without mixing the heat transfer fluids in the coolant subsystem 30 and heat pump subsystems 32. Heat may be transferred from the heat pump subsystem 32 to the coolant via the intermediate heat exchanger 42 when the climate control system 24 is in a heating mode as will be discussed in more detail below.

The heater core 44 may transfer thermal energy from the coolant to air in the passenger compartment 20. The heater core 44 may be disposed in the passenger compartment 20 in the ventilation subsystem 34 and may have any suitable configuration. For example, the heater core 44 may have a plate-fin or tube-fin construction in one or more examples.

The heat pump subsystem 32 may transfer thermal energy to or from the passenger compartment 20 and to the coolant subsystem 30. In at least one example, the heat pump subsystem 32 may be configured as a vapor compression heat pump subsystem in which a fluid is circulated through the heat pump subsystem 32 to transfer thermal energy to or from the passenger compartment 20. The heat pump subsystem 32 may operate in various modes, including, but not limited to a cooling mode and a heating mode. In the cooling mode, the heat pump subsystem 32 may circulate a heat transfer fluid, which may be called a refrigerant, to transfer thermal energy from inside the passenger compartment 20 to outside the passenger compartment 20.

The ventilation subsystem 34 may circulate air in the passenger compartment 20 of the vehicle 10. In addition, airflow through the housing 90 and internal components is represented by the arrowed lines 277.

Controller 212 includes executable instructions of the methods in FIGS. 5-8 to operate the valves, fans, and pumps or compressors of the system shown in FIGS. 2-4B. Controller 212 includes inputs 201 and outputs 202 to interface with devices in the system of FIGS. 2-4B. Controller 212 also includes a central processing unit 205 and non-transitory memory 206 for executing the method of FIGS. 5-8.

Each of the devices shown in FIGS. 2-4B that are fluidically coupled via conduits (e.g., solid lines) have an inlet and an outlet based on the direction of flow direction arrows 204, 206, 302, 304, 402, 404, and 406. Inlets of the devices are locations where the conduit enters the device in the direction of flow according to the flow direction arrows. Outlets of the devices are locations where the conduit exits the device in the direction of flow according to the flow direction arrows.

The system of FIG. 2 may be operated in a cooling mode. In cooling mode, passenger compartment 20 may be cooled. The cooling mode is activated by opening fixed first control valve 262, opening the shut-off valve of battery chiller TXV 274 if battery chilling is desired, opening the shut-off valve of expansion device 74, closing second control valve 222, activating compressor 60, activating fan 92, and activating battery chiller pump 224 if desired.

During cooling mode, refrigerant flows through heat pump subsystem 32 in the direction of arrows 204. Coolant flows in battery chiller loop 236 in the direction indicated by arrows 206. Thus, in cooling mode, refrigerant exits compressor 60 and enters intermediate heat exchanger 42. The refrigerant then moves through the first control valve 262, thereby reducing flow through expansion device 264, so that the pressure loss across expansion device 264 is small. Refrigerant travels from the first control valve 262 to the exterior heat exchanger 66 which operates as a condenser. Condensed refrigerant then enters internal heat exchanger 78 where heat may be transferred from condensed refrigerant entering internal heat exchanger 78 from exterior heat exchanger 66 to vapor refrigerant entering internal heat exchanger from interior heat exchanger 76. The liquid refrigerant then enters expansion device 74 and battery chiller TXV 274 where it expands to provide cooling to passenger compartment 20 and battery chiller loop 235. Heat is transferred from coolant circulating in battery chiller loop 235 to refrigerant in heat pump subsystem 32 via battery chiller heat exchanger 236. Likewise, heat is transferred from passenger compartment 20 to refrigerant in heat pump subsystem 32 via interior heat exchanger 76. The heated refrigerant is directed to internal heat exchanger 78 before it is returned to compressor 60 to be recirculated.

The ventilation subsystem 34 may circulate air in the passenger compartment 20 of the vehicle 10. The ventilation subsystem 34 may have a housing 90, a blower 92, and a temperature door 94. The housing 90 may receive components of the ventilation subsystem 34. In FIG. 2, the housing 90 is illustrated such that internal components are visible rather than hidden for clarity. In addition, airflow through the housing 90 and internal components is represented by the arrowed lines 277. The housing 90 may be at least partially disposed in the passenger compartment 20. For example, the housing 90 or a portion thereof may be disposed under an instrument panel of the vehicle 10. The housing 90 may have an air intake portion 100 that may receive air from outside the vehicle 10 and/or air from inside the passenger compartment 20. For example, the air intake portion 100 may receive ambient air from outside the vehicle 10 via an intake passage, duct, or opening that may be located in any suitable location, such as proximate a cowl, wheel well, or other vehicle body panel. The air intake portion 100 may also receive air from inside the passenger compartment 20 and recirculate such air through the ventilation subsystem 34. One or more doors or louvers may be provided to permit or inhibit air recirculation.

The blower 92 may be disposed in the housing 90. The blower 92, which may also be called a blower fan, may be disposed near the air intake portion 100 and may be configured as a centrifugal fan that may circulate air through the ventilation subsystem 34.

The temperature door 94 may be disposed between the interior heat exchanger 76 and the heater core 44. In the example shown, the temperature door 94 is disposed downstream of the interior heat exchanger 76 and upstream of the heater core 44. The temperature door 94 may block or permit airflow through the heater core 44 to help control the temperature of air in the passenger compartment 20. For instance, the temperature door 94 may permit airflow through the heater core 44 in the heating mode such that heat may be transferred from the coolant to air passing through the heater core 44. This heated air may then be provided to a plenum for distribution to ducts and vents or outlets located in the passenger compartment 20. The temperature door 94 may move between a plurality of positions to provide air having a desired temperature. In FIG. 2, the temperature door 94 is shown in a full heat position in which airflow is directed through the heater core 44.

Temperature sensor 250 senses refrigerant temperature at outlet side 66B of exterior heat exchanger 66. Temperature sensor 250 may be located on a fin or tube of exterior heat exchanger 66. Alternatively, temperature sensor 250 may be located in a flow path of refrigerant in exterior heat exchanger 66. Pressure sensor 251 senses refrigerant pressure at outlet side 60B of compressor 60. Optional pressure sensor 252 senses refrigerant pressure at inlet side or suction side 60A of compressor 60. Pressure sensor 253 senses refrigerant pressure at an outlet side of battery chiller heat exchanger 236. Optional pressure sensor 254 senses refrigerant pressure at an inlet side of accumulator 72. Temperature sensor 255 senses refrigerant temperature an outlet side of interior heat exchanger 76. Temperature sensor 255 may be located on a fin or tube of interior heat exchanger 76. Alternatively, temperature sensor 255 may be located in a flow path of refrigerant in interior heat exchanger 76. Signals from temperature and pressure sensors 250-255 are input to controller 212.

Figure 3:
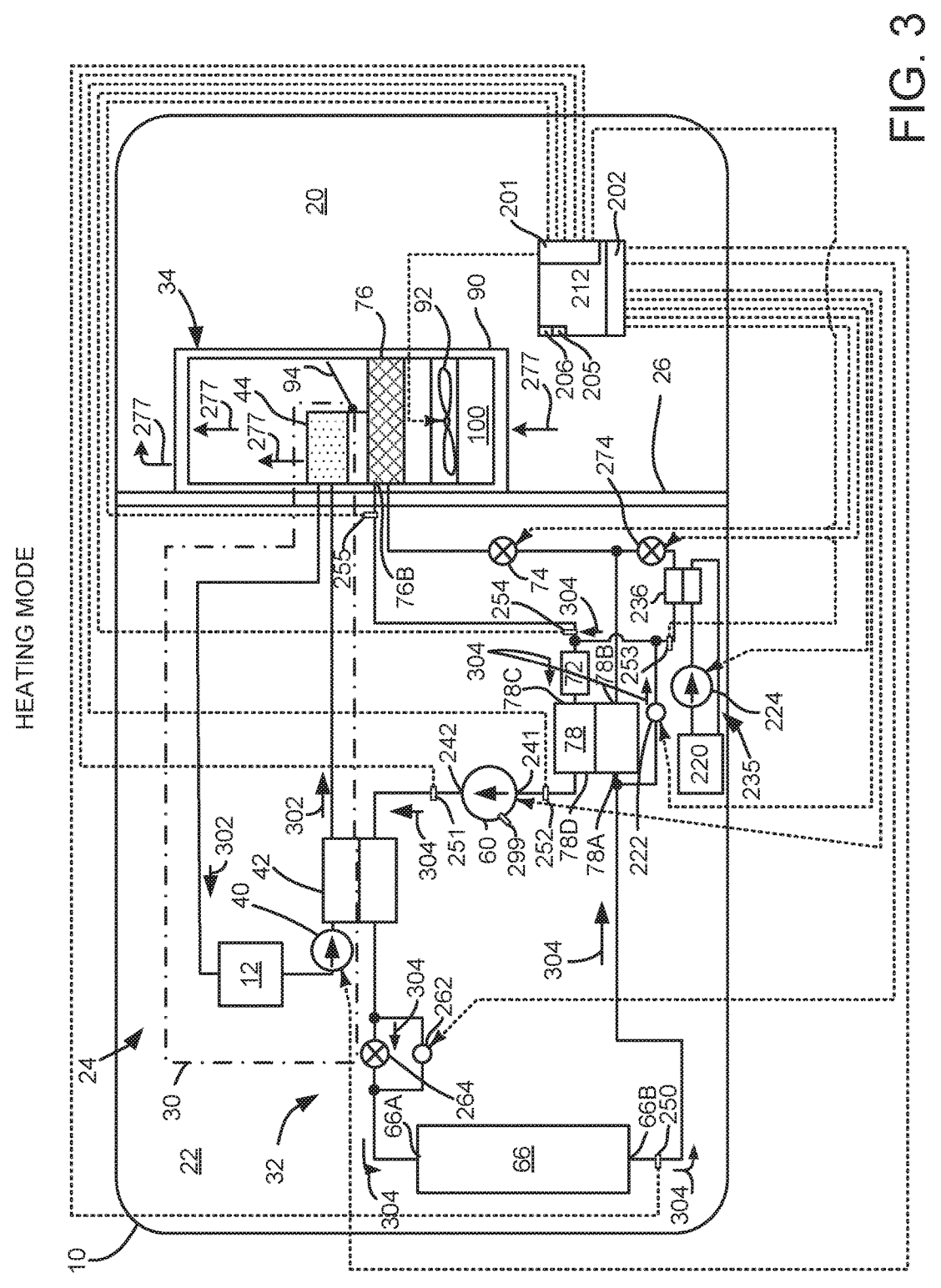
Figure 4A:
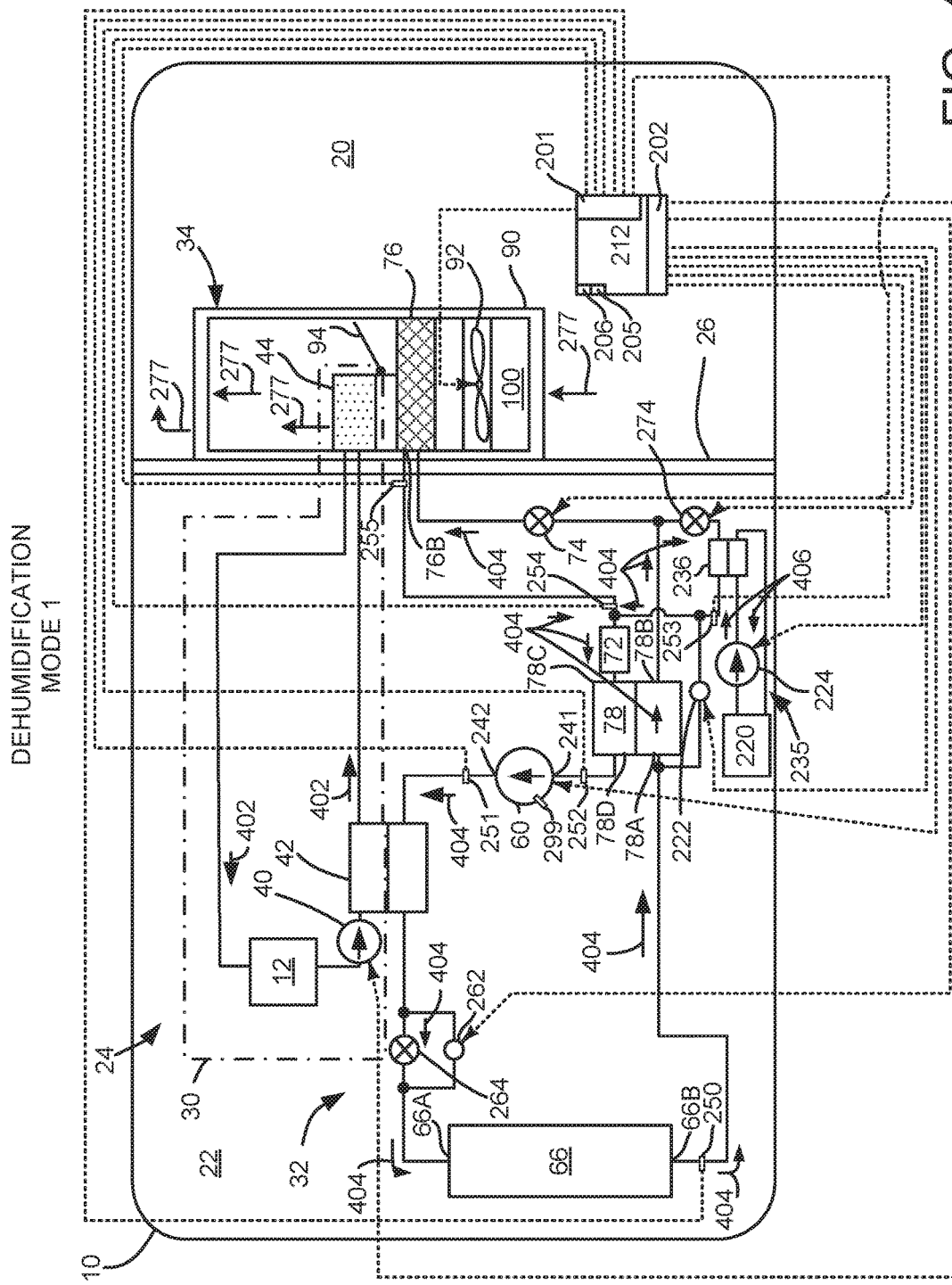
Figure 4B:
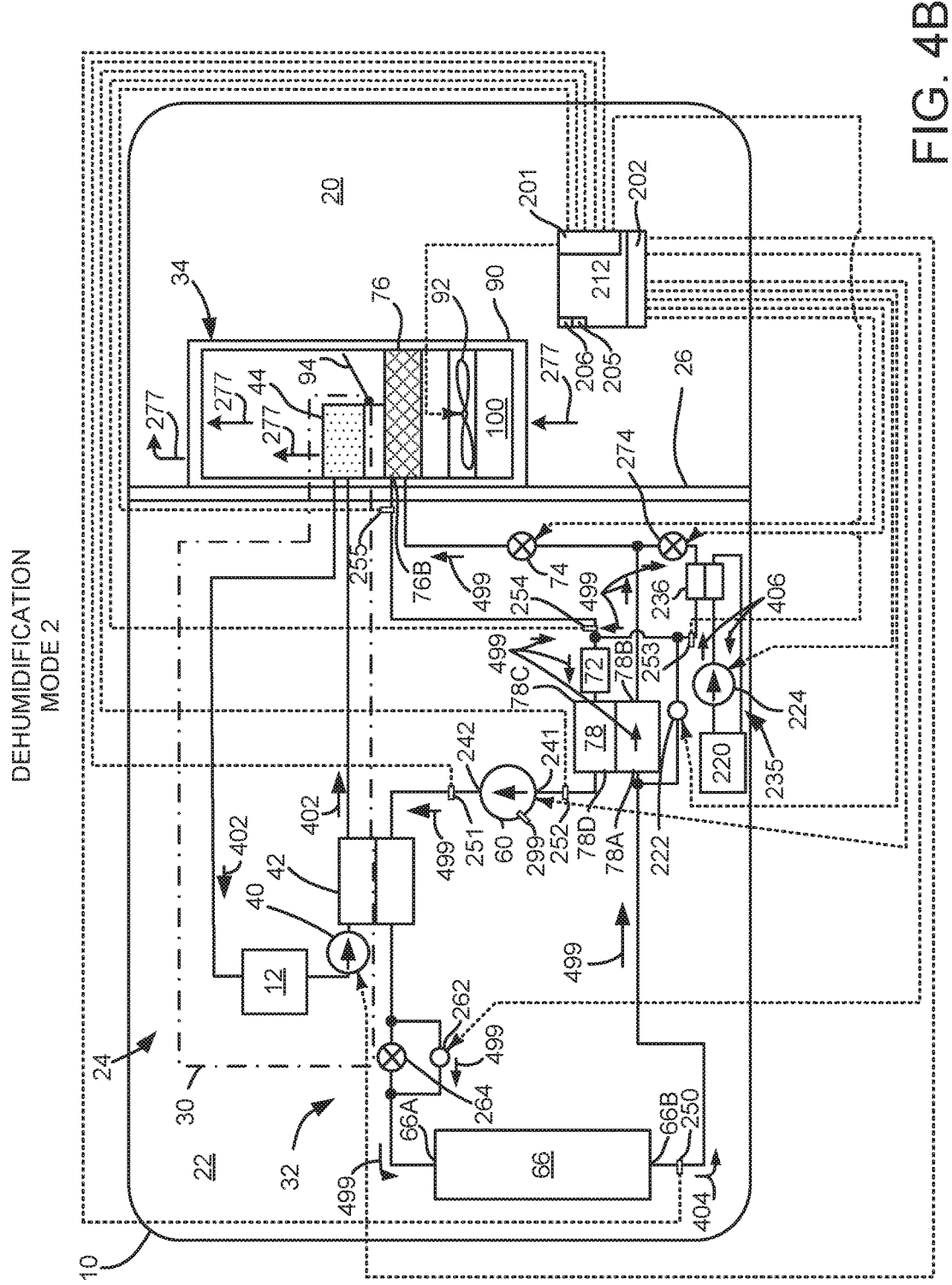

Components of the system shown in FIGS. 3-4B having the same numerical labels shown in FIG. 2 are the same as components described in the system of FIG. 2. Further, the components or devices operate the same as described in FIG. 2 unless otherwise described. For example, exterior heat exchanger 66 shown in FIG. 2 and exterior heat exchanger 66 shown in FIG. 3 have the same numerical label 66.

Referring now to FIG. 3, climate control system 24 is the same as climate control system 24 shown in FIG. 2; however, FIG. 3 shows climate control system 24 operating in a heating mode. In heating mode, passenger compartment 20 may be warmed. The heating mode is activated by closing first control valve 262, closing the shut-off valve of battery chiller TXV 274, closing the shut-off valve of expansion device 74, opening second control valve 222, activating compressor 60, activating fan 92, and activating coolant pump 40. During heating mode, refrigerant flows through heat pump subsystem 32 (e.g., refrigerant loop) in the direction of arrows 304. Coolant flows in coolant subsystem 30 in the direction indicated by arrows 302.

In heating mode, refrigerant exits compressor 60 and enters intermediate heat exchanger 42 which operates as a condenser. Heat is transferred from refrigerant to coolant in coolant subsystem 30 via intermediate heat exchanger 42. Coolant circulating in coolant subsystem 30 is heated at intermediate heat exchanger 42 before it enters heater core 44 where passenger compartment air extracts heat from the circulating coolant. Coolant is then returned to coolant pump 40 to be recirculated.

The refrigerant exits intermediate heat exchanger 42 and moves through fixed area expansion device 264, and not first control valve 262, so that refrigerant expansion occurs. Refrigerant travels from the fixed area expansion device 264 to the exterior heat exchanger 66 which operates as an evaporator. Refrigerant exits exterior heat exchanger 66 and passes through second control valve 222. The refrigerant then passes through an inlet of accumulator 72 before entering input 78C of internal heat exchanger 78 before returning to compressor 60. Compressor 60 increases refrigerant temperature and pressure. Refrigerant does not flow through interior heat exchanger 76 and battery chiller heat exchanger 236 in heating mode.

Referring now to FIG. 4A, climate control system 24 is the same as climate control system 24 shown in FIG. 2; however, FIG. 4A shows climate control system 24 operating in a first dehumidification mode. For the sake of brevity, the description of FIG. 2 applies except for the differences described hereafter. The first dehumidification mode provides for removing moisture from passenger compartment air and reheating the air. The first dehumidification mode is activated by closing first control valve 262, optionally opening the shut-off valve of battery chiller expansion device 274, opening the shut-off valve of expansion device 74, closing second control valve 222, activating compressor 60, activating fan 92, activating coolant pump 40, and activating battery chiller pump 224 if desired.

During the first dehumidification mode, refrigerant flows through heat pump subsystem 32 in the direction of arrows

404. Passing refrigerant through expansion device 264 and exterior heat exchanger 66 changes the refrigerant state from all vapor to a variable mixture of vapor and liquid before the refrigerant passes through internal heat exchanger 78 and interior heat exchanger 76. Coolant flows in coolant subsystem 30 in the direction indicated by arrows 402.

Activating coolant pump 40 allows heat to be transferred from refrigerant in heat pump subsystem 32 to coolant in coolant subsystem 40 via intermediate heat exchanger 42. At least a portion of heat extracted from passenger compartment 20 via interior heat exchanger 76 may be returned to passenger compartment 20 via heater core 44. Moisture in passenger compartment air may be extracted by first cooling passenger compartment air at interior heat exchanger 76. The moisture reduced passenger compartment air may then be heated via heater core 44 to warm the passenger compartment or defog vehicle windows.

Referring now to FIG. 4B, climate control system 24 is the same as climate control system 24 shown in FIG. 2; however, FIG. 4B shows climate control system 24 operating in a second dehumidification mode. The second dehumidification mode also provides for removing moisture from passenger compartment air and reheating the air. The second dehumidification mode is activated by opening first control valve 262, optionally opening the shut-off valve of battery chiller expansion device 274, opening the shut-off valve of expansion device 74, closing second control valve 222, activating compressor 60, activating fan 92, activating coolant pump 40, and activating battery chiller pump 224 if desired.

During the second dehumidification mode, refrigerant flows through heat pump subsystem 32 in the direction of arrows 499. A large portion of refrigerant by-passes expansion device 264 and enters exterior heat exchanger 66 when first control valve 262 is open. Consequently, the refrigerant changes state from vapor to liquid before reaching expansion device 74. Coolant flows in coolant subsystem 30 in the direction indicated by arrows 402. Coolant may flow through battery chiller loop 235 in the direction of arrows 406.

Activating coolant pump 40 allows heat to be transferred from refrigerant in heat pump subsystem 32 to coolant in coolant subsystem 40 via intermediate heat exchanger 42. At least a portion of heat extracted from passenger compartment 20 via interior heat exchanger 76 may be returned to passenger compartment 20 via heater core 44. Moisture in passenger compartment air may be extracted by first cooling passenger compartment air at interior heat exchanger 76. The moisture reduced passenger compartment air may then be heated via heater core 44 to warm the passenger compartment or defog vehicle windows.

Thus, the system of FIGS. 1-4B provides for a vehicle system, comprising: a refrigerant loop including a compressor; a first pressure sensor; and a controller including executable instructions stored in non-transitory memory to adjust a speed of the compressor in response to a pressure ratio across an outlet of the compressor and an inlet of the compressor, the pressure ratio based at least in part on output of the first pressure sensor. The vehicle system includes where the first pressure sensor is positioned to sense outlet pressure of the compressor. The vehicle system further comprises additional instructions to estimate a pressure at the inlet of the compressor.

In some examples, the vehicle system includes where the pressure at the inlet of the compressor is based on a pressure at an outlet of a battery chiller heat exchanger. The vehicle system includes where the pressure at the inlet of the compressor is based on a pressure at an outlet of an exterior heat exchanger. The vehicle system includes where the pressure at the inlet of the compressor is based on a pressure at an outlet of a vehicle passenger cabin heat exchanger or interior heat exchanger. The vehicle system further comprises additional instructions to adjust the speed of the compressor responsive to a compressor pressure ratio control mode proportional/integral controller that adjusts the speed of the compressor only when a compressor pressure ratio exceeds a threshold pressure ratio.

In a first example, the system also provides for a vehicle system, comprising: a refrigerant loop including a compressor; a first pressure sensor; and a controller including executable instructions stored in non-transitory memory to adjust a speed of the compressor in a first mode in response to a pressure ratio across an outlet of the compressor and an inlet of the compressor, and to adjust the speed of the compressor in a second mode response to a pressure at the outlet of the compressor and not a pressure at the inlet of the compressor. In a second example, the vehicle system includes where the pressure ratio is based at least in part on output of the first pressure sensor.

In some examples, the vehicle system further comprises a second pressure sensor positioned at the inlet of the compressor, and further comprising basing the pressure ratio on the second pressure sensor positioned at the inlet of the compressor. The vehicle system further comprises additional instructions to adjust the speed of the compressor responsive to a proportional/integral controller that adjusts the speed of the compressor only when a pressure at the outlet of the compressor exceeds a threshold pressure. The vehicle system includes where the first mode is activated in response to operating a heat pump that includes the refrigerant loop in a heating mode. The vehicle system includes where the second mode is activated in response to operating a heat pump that includes the refrigerant loop in a cooling mode. The vehicle system includes where the first mode is activated in response to operating a heat pump that includes the refrigerant loop in a dehumidification mode.

Figure 5:
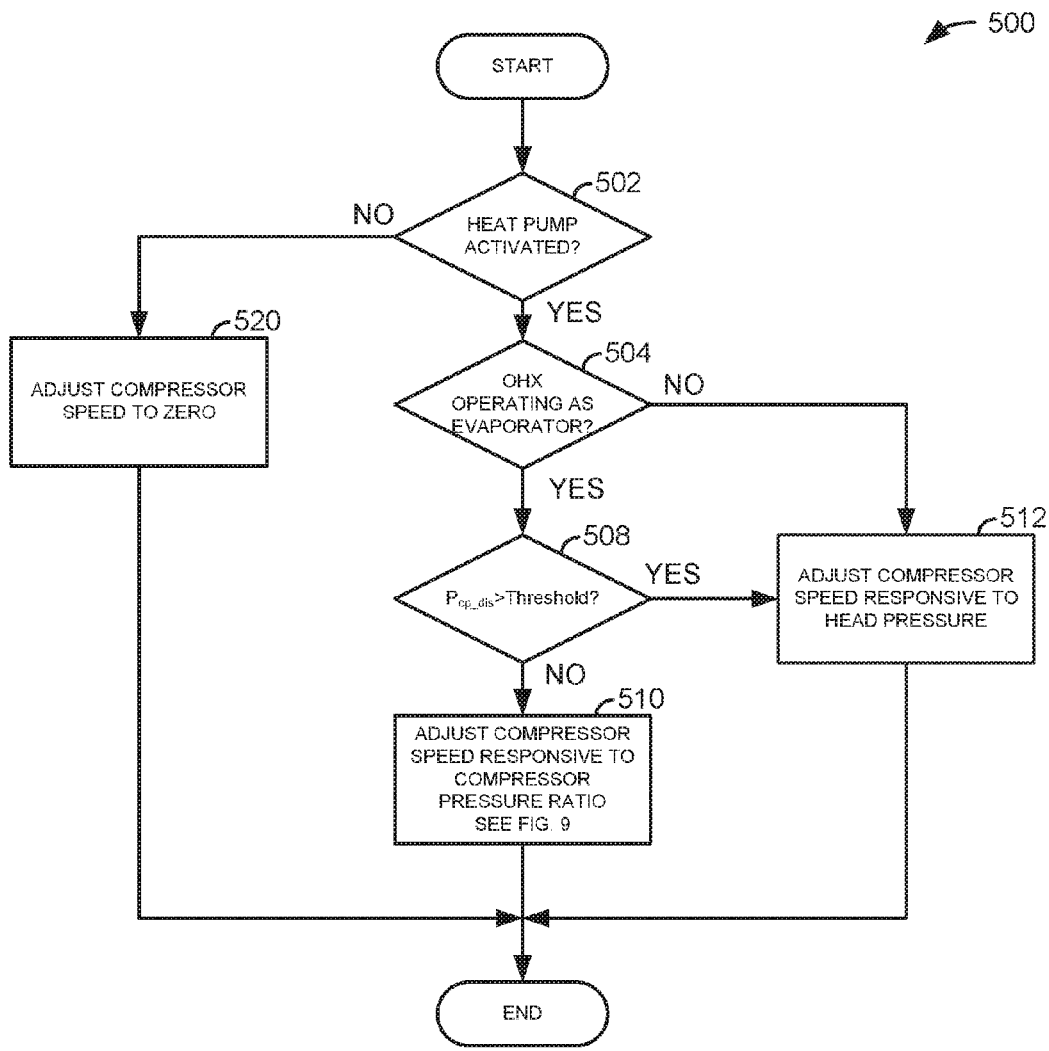
FIG. 5 shows a method for operating a heat pump of the type shown in the system of FIGS. 2-4B.

Referring now to FIG. 5, a method for operating a climate control system is shown. The method of FIG. 5 may provide the climate control system modes described in FIGS. 2-4B. Further, at least portions of the method of FIG. 5 may be included in the system of FIGS. 2-4B as executable instructions stored in non-transitory memory. Further still, portions of the method of FIG. 5 may be actions taken in the physical world by a controller in cooperation with the methods of FIGS. 6-9.

At 502, method 500 judges if the climate control system heat pump is activated. Method 500 may judge that the heat pump is activated based on input from a driver to a controller. If method 500 judges that the heat pump is activated, the answer is yes and method 500 proceeds to 504. Otherwise, the answer is no and method 500 proceeds to 520.

At 520, method 500 deactivates the heat pump compressor. Further, power may be removed from the various expansion valve bypass valves and shut-off valves within the expansion valves so that the climate control system enters a default mode, such as heating mode. Alternatively, the various expansion valve bypass valves and shut-off valves within the expansion devices may be held in their present states. Method 500 proceeds to exit after the compressor and valves have been deactivated. The compressor speed is zero when the compressor is deactivated.

At 504, method 500 judges if the climate control system's exterior or outside heat exchanger (OHX) 66 or exterior heat exchanger is operating as an evaporator. The OHX operates as an evaporator in heating mode and the first dehumidification mode. The OHX operates as a condenser in cooling mode and the second dehumidification mode. If method 500 judges that the heat pump is in heating mode or the first dehumidification mode, the OHX is operating as an evaporator and method 500 proceeds to 508. If method 500 judges that the OHX is not operating as an evaporator, such as during cooling mode where the OHX operates as a condenser, method 500 proceeds to 512.

At 508, method 500 judges if a pressure at an outlet side of the heat pump compressor ($P_{cp\_dis}$), or head pressure, is greater than a system maximum threshold pressure. In one example, pressure at the outlet side of the heat pump compressor may be determined via a pressure sensor. If so, the answer is yes and method 500 proceeds to 512. Otherwise, the answer is no and method 500 proceeds to 510.

At 512, method 500 adjusts heat pump compressor speed responsive to head pressure or outlet pressure of the heat pump compressor. By adjusting compressor speed responsive to heat pump compressor outlet pressure, the system controls the condensing pressure when the exterior heat exchanger is operating as a condenser. Further, adjusting compressor speed responsive to compressor head pressure provides for limiting head pressure whether the pressure ratio across the pump is large or small so that desirable system pressures may not be exceeded.

Compressor speed control based on compressor head pressure may be performed via two proportional/integral (PI) controllers. A first PI controller is a temperature controller that controls compressor speed in response to a temperature in the heat pump system. For example, in cooling or dehumidification mode, compressor speed may be adjusted responsive to a temperature at an outlet side of an evaporator (e.g., exterior heat exchanger). In heating mode, the compressor speed may be adjusted responsive to heater core temperature. If compressor head pressure is greater than a threshold pressure (e.g., a system pressure limit), a second PI controller is activated. The second PI controller may adjust compressor speed to reduce compressor head pressure.

In one example during heat pump cooling mode, compressor speed is adjusted via a head pressure proportional/integral controller. Specifically, compressor speed is adjusted responsive to compressor head pressure and evaporator or refrigerant temperature. An actual evaporator or refrigerant temperature is subtracted from a desired evaporator temperature to provide an evaporator temperature error. The evaporator temperature error is multiplied by evaporator temperature proportional and integral gains in a first loop of the compressor controller to provide a first compressor speed adjustment. An actual compressor outlet pressure is subtracted from a head pressure limit to provide a head pressure error value. If the head pressure error value is negative, it is multiplied by head pressure proportional and integral gains to provide a second compressor speed adjustment. The head pressure proportional and integral gains have more control authority than the evaporator temperature proportional and integral gains. The first and second compressor speed adjustments are added and compressor speed is adjusted based on the result. Method 500 proceeds to exit after heat pump compressor speed is adjusted.

At 510, method 500 adjusts heat pump compressor speed in response to a pressure ratio between an outlet of the heat pump compressor and an inlet of the heat pump compressor. In one example, the heat pump compressor speed is controlled according to the method of FIG. 9 (e.g., a third PI controller). The pressure at the heat pump compressor inlet may be measured or estimated according to one of the methods described in FIGS. 6-8. Method 500 adjusts speed of the heat pump compressor responsive to the pressure ratio between the outlet of the heat pump compressor and the inlet of the heat pump compressor because pressure at the heat pump inlet may vary widely when the OHX operates as an evaporator. If the pressure ratio is too high, compressor lubrication may be limited, thereby resulting in compressor degradation. By adjusting compressor speed responsive to the heat pump pressure ratio, the possibility of operating the compressor at low flow conditions may be reduced. Larger heat pump pressure ratios may result from evaporator outlet pressures that are driven by exterior ambient temperatures. Thus, it may be desirable to control heat pump compressor speed responsive to the pressure ratio instead of compressor head pressure during conditions where the exterior heat exchanger is operating as an evaporator. Method 500 proceeds to exit after compressor speed is adjusted.

In this way, the heat pump compressor speed may be adjusted based on a ratio of compressor head pressure and compressor inlet pressure when compressor inlet pressure may vary widely due to the OHX operating as an evaporator.

Figure 6:
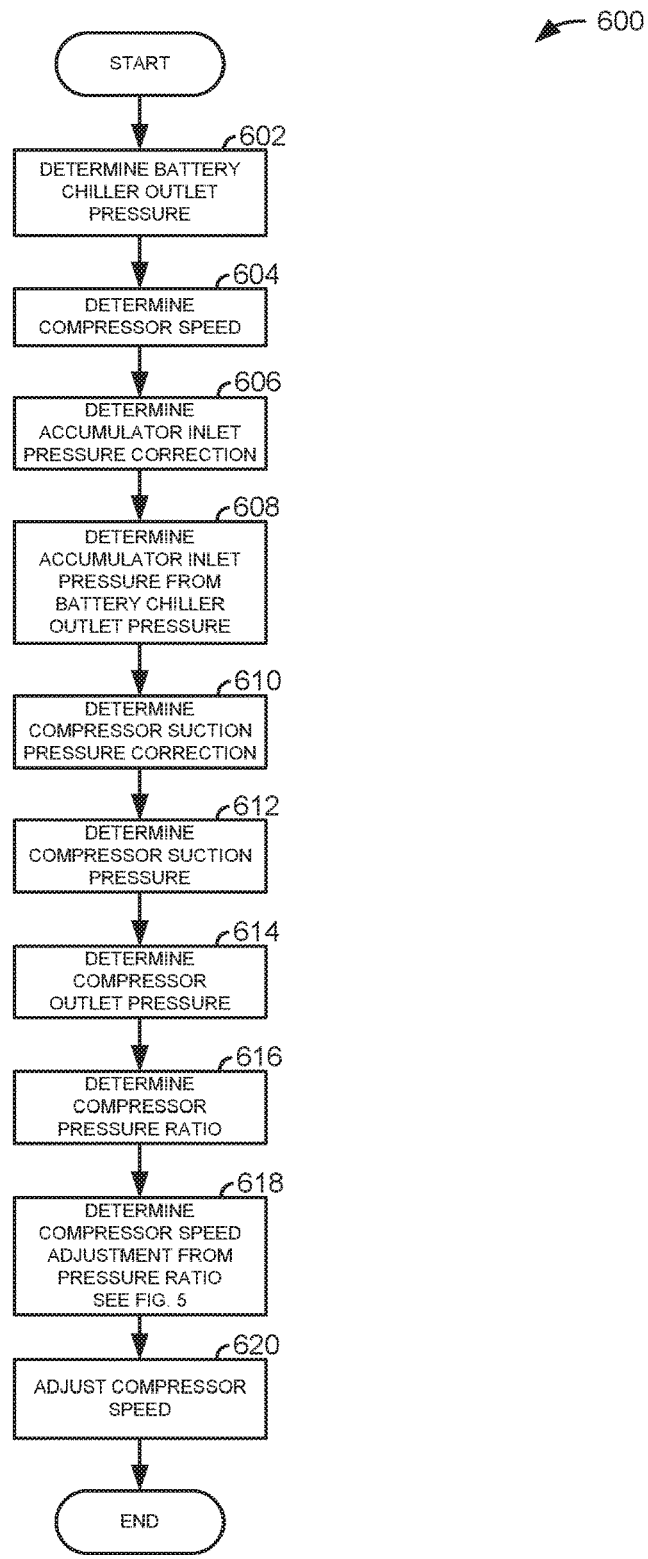
FIGS. 6-8 show different methods for inferring heat pump compressor inlet pressure for determining a pressure ratio across a vehicle heat pump compressor.

Referring now to FIG. 6, a method for inferring heat pump compressor inlet pressure is shown. The method of FIG. 6 may operate in concert with the methods of FIGS. 5 and 9 in the system of FIGS. 1-4B. Further, portions of method 600 may be incorporated to a controller as executable instructions stored in non-transitory memory while other portions of the method of FIG. 6 may be physical actions taken in the physical world via a controller. The method of FIG. 6 may be activated when the heat pump operates in a heating mode.

At 602, method 600 determines pressure at an outlet of a battery chiller heat exchanger. The battery chiller heat exchanger may be positioned in the climate control system as is shown in FIGS. 2-4B. In one example, a pressure sensor is positioned at an outlet of the battery chiller heat exchanger and the pressure sensor supplies a signal to a controller that determines pressure at the outlet of the battery chiller heat exchanger based on the signal. Method 600 proceeds to 604 after pressure at the battery chiller heat exchanger outlet is determined.

At 604, method 600 determines compressor speed. Compressor speed may be determined via a speed sensor or it may be inferred via voltage and current supplied to operate compressor 60. Method 600 proceeds to 606 after compressor speed is determined.

At 606, method 600 determines an accumulator inlet pressure correction. In one example, the accumulator is positioned in the climate control system 24 as shown in FIGS. 2-4B. The pressure correction between the battery chiller outlet and the accumulator inlet is based on heat pump compressor speed. In particular, a table of empirically determined pressure correction values based on compressor speed is indexed by compressor speed and the table outputs a pressure correction value. Method 600 proceeds to 608 after the accumulator inlet pressure correction is determined.

At 608, method 600 determines accumulator inlet pressure. In one example, the accumulator inlet pressure is based on battery chiller heat exchanger outlet pressure. In particular, the accumulator inlet pressure is determined by subtracting the correction determined at 606 from the battery chiller outlet pressure determined at 602. Method 600 proceeds to 610 after the accumulator inlet pressure is determined.

At 610, method 600 determines a heat pump compressor inlet pressure or suction pressure correction. In one example, the heat pump compressor 60 is positioned in the climate control system 24 as shown in FIGS. 2-4B. The pressure correction between the accumulator inlet and the heat pump compressor inlet is based on heat pump compressor speed. In particular, a table of empirically determined pressure correction values based on compressor speed is indexed by compressor speed and the table outputs a pressure correction value for the heat pump compressor inlet. Method 600 proceeds to 612 after the heat pump compressor inlet pressure correction is determined.

At 612, method 600 determines heat pump compressor inlet pressure. In one example, the heat pump compressor inlet pressure is based on the accumulator inlet pressure and the heat pump compressor inlet pressure correction. In particular, the heat pump compressor inlet pressure correction is subtracted from the accumulator inlet pressure determined at 608 to determine the heat pump compressor inlet pressure. Method 600 proceeds to 614 after the heat pump compressor inlet pressure is determined.

At 614, method 600 determines outlet pressure at an outlet of the heat pump compressor. In one example, a pressure sensor is positioned at the heat pump compressor outlet and the pressure sensor supplies a signal to a controller that determines pressure at the heat pump compressor outlet based on the signal. Method 600 proceeds to 616 after pressure at the heat pump compressor outlet is determined.

At 616, method 600 determines a heat pump compressor pressure ratio. The heat pump compressor pressure ratio is determined by dividing the heat pump compressor outlet pressure determined at 614 by the compensated heat pump compressor inlet pressure determined at 612. Method 600 proceeds to 618 after the heat pump compressor pressure ratio is determined.

At 618, method 600 determines a heat pump compressor speed adjustment from the heat pump pressure ratio. The compressor speed may be determined as is described in FIGS. 5 and 9. Method 600 proceeds to 620 after the heat pump compressor speed adjustment is determined.

At 620, method 600 adjusts the heat pump compressor speed. The heat pump compressor speed may be increased via adjusting a voltage frequency and/or increasing an amount of electrical current and/or voltage supplied to the heat pump compressor via a controller. The heat pump compressor speed may be decreased via reducing a voltage frequency and/or decreasing an amount of electrical current or voltage supplied to the heat pump compressor via a controller. Further, the heat pump compressor speed may be closed-loop controlled based on a measured heat pump compressor speed. Method 600 proceeds to exit after heat pump compressor speed is adjusted.

In this way, the heat pump compressor pressure ratio may be estimated based on battery chiller outlet pressure. If the pressure ratio is greater than is desired, the compressor speed may be reduced to increase refrigerant and lubricant flow through the heat pump compressor.

Figure 7:
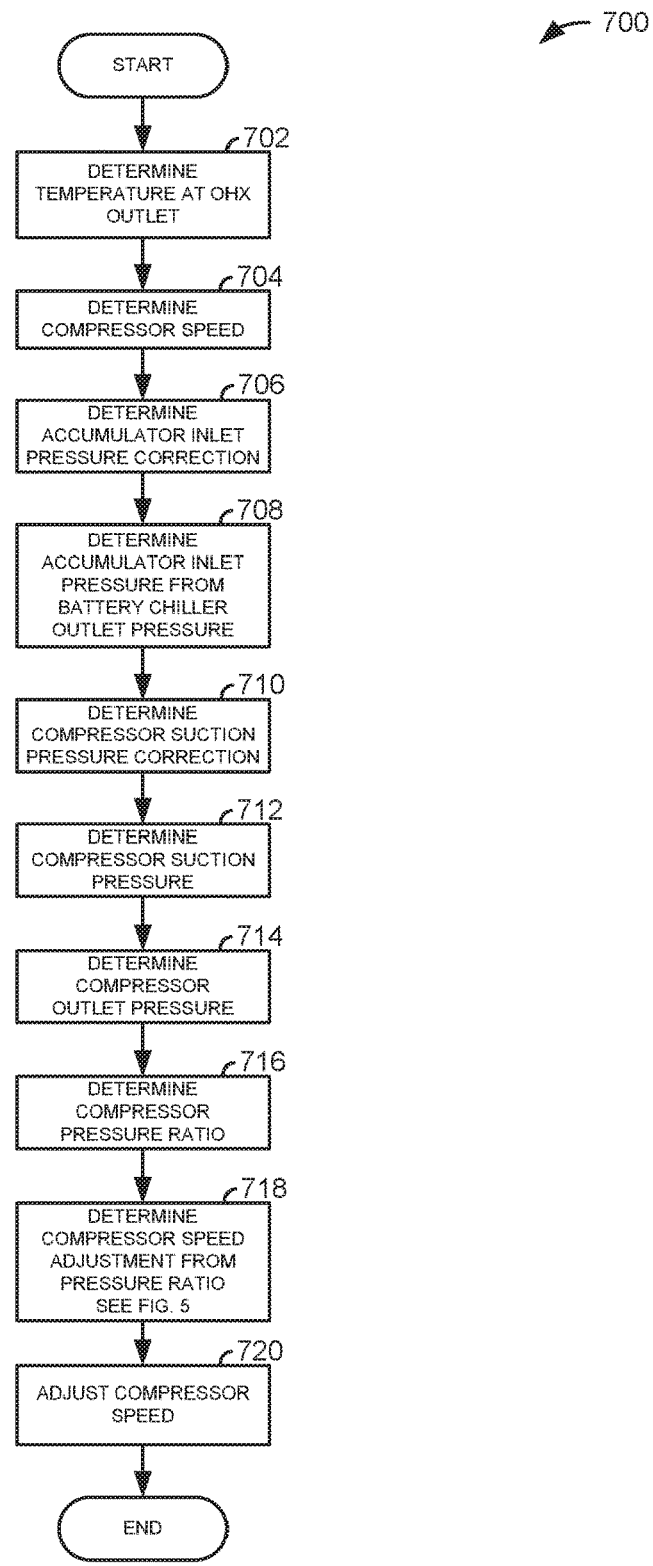

Referring now to FIG. 7, a method for inferring heat pump compressor inlet pressure is shown. The method of FIG. 7 may operate in concert with the methods of FIGS. 5 and 9 in the system of FIGS. 1-4B. Further, portions of method 700 may incorporated to a controller as executable instructions stored in non-transitory memory while other portions of the method of FIG. 7 may be physical actions taken in the physical world via a controller. The method of FIG. 7 may be activated when the heat pump operates in a heating mode and does not include a battery chiller heat exchanger.

At 702, method 700 determines temperature at an outlet of the OHX and estimates pressure at the OHX outlet based on temperature at the outlet of the OHX. The OHX may be positioned in the climate control system as is shown in FIGS. 2-4B. In one example, a temperature sensor is positioned at an outlet of the OHX and the temperature sensor supplies a signal to a controller that determines temperature at the outlet of the OHX based on the signal. The temperature at the outlet of the OHX is used to index a table of thermodynamic property based saturation pressures at the outlet of the OHX. The saturation pressures are an estimate of pressure at the outlet of the OHX. Method 700 proceeds to 704 after temperature and pressure at the OHX outlet is determined.

At 704, method 700 determines compressor speed. Compressor speed may be determined via a speed sensor or it may be inferred via voltage and current supplied to operate compressor 60. Method 700 proceeds to 706 after compressor speed is determined.

At 706, method 700 determines an accumulator inlet pressure correction. The pressure correction between the OHX outlet and the accumulator inlet is based on heat pump compressor speed. In particular, a table of empirically determined pressure correction values based on compressor speed is indexed by compressor speed and the table outputs a pressure correction value. Method 700 proceeds to 708 after the accumulator inlet pressure correction is determined.

At 708, method 700 determines accumulator inlet pressure. In one example, the accumulator inlet pressure is based on OHX outlet pressure determined at 702 and the accumulator inlet pressure correction determined at 706. In particular, the accumulator inlet pressure correction determined at 706 is subtracted from the OHX outlet pressure determined at 702 to determine the accumulator inlet pressure. Method 700 proceeds to 710 after the accumulator inlet pressure is determined.

At 710, method 700 determines a heat pump compressor inlet pressure or suction pressure correction. The pressure correction between the accumulator inlet and the heat pump compressor inlet accumulator input is based on heat pump compressor speed. In particular, a table of empirically determined pressure correction values based on compressor speed is indexed by compressor speed and the table outputs a pressure correction value for the heat pump compressor inlet. Method 700 proceeds to 712 after the heat pump compressor inlet pressure correction is determined.

At 712, method 700 determines heat pump compressor inlet pressure. In one example, the heat pump compressor inlet pressure is determined by subtracting the heat pump compressor inlet compressor correction determined a 710 from the accumulator inlet pressure determined at 708. Method 700 proceeds to 714 after the heat pump compressor inlet pressure is determined.

At 714, method 700 determines outlet pressure at an outlet of the heat pump compressor. In one example, a pressure sensor is positioned at the heat pump compressor outlet and the pressure sensor supplies a signal to a controller that determines pressure at the heat pump compressor outlet based on the signal. Method 700 proceeds to 716 after pressure at the heat pump compressor outlet is determined.

At 716, method 700 determines a heat pump compressor pressure ratio. The heat pump compressor pressure ratio is determined by dividing the heat pump compressor outlet pressure determined at 714 by the compensated heat pump compressor inlet pressure determined at 712. Method 700 proceeds to 718 after the heat pump compressor pressure ratio is determined.

At 718, method 700 determines a heat pump compressor speed adjustment from the heat pump pressure ratio. The compressor speed may be determined as is described in FIGS. 5 and 9. Method 700 proceeds to 720 after the heat pump compressor speed adjustment is determined.

At 720, method 700 adjusts the heat pump compressor speed. The heat pump compressor speed may be increased via increasing a frequency of a voltage and/or increasing an amount of electrical current or voltage supplied to the heat pump compressor via a controller. The heat pump compressor speed may be decreased via decreasing a frequency of a voltage and/or decreasing an amount of electrical current or voltage supplied to the heat pump compressor via a controller. Further, the heat pump compressor speed may be closed-loop controlled based on a measured heat pump compressor speed. Method 700 proceeds to exit after heat pump compressor speed is adjusted.

In this way, the heat pump compressor pressure ratio may be estimated based on OHX outlet temperature. If the pressure ratio is greater than is desired, the compressor speed may be reduced to increase refrigerant flow and lubricant flow through the heat pump compressor.

Figure 8:
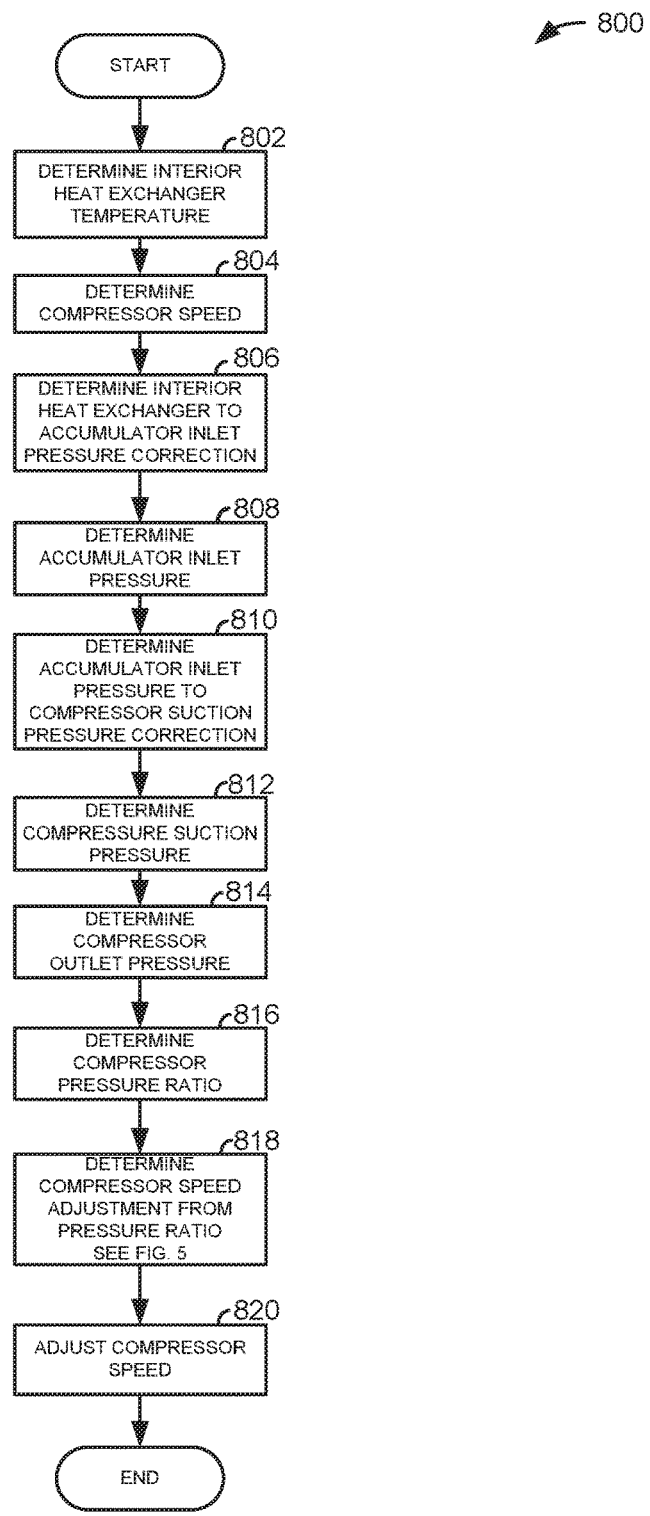

Referring now to FIG. 8, a method for inferring heat pump compressor inlet pressure is shown. The method of FIG. 8 may operate in concert with the methods of FIGS. 5 and 9 in the system of FIGS. 1-4B. Further, portions of method 800 may incorporated to a controller as executable instructions stored in non-transitory memory while other portions of the method of FIG. 8 may be physical actions taken in the physical world via a controller. The method of FIG. 8 may be activated when the heat pump operates in a dehumidification mode.

At 802, method 800 determines temperature at an outlet of the interior heat exchange 76 and estimates pressure at the interior heat exchanger outlet based on temperature at the outlet of the interior heat exchanger. In one example, a temperature sensor is positioned at an outlet of the interior heat exchanger and the temperature sensor supplies a signal to a controller that determines temperature at the outlet of the interior heat exchanger based on the signal. The temperature sensor may be in thermal communication with a fin or tube of the interior heat exchanger. Alternatively, the temperature sensor may be positioned in a flow path of refrigerant. The temperature at the outlet of the interior heat exchanger is used to index a table of thermodynamic property based saturation pressures at the outlet of the interior heat exchanger. The saturation pressures are an estimate of pressure at the outlet of the interior heat exchanger. Method 800 proceeds to 804 after temperature and pressure at the interior heat exchanger outlet is determined.

At 804, method 800 determines compressor speed. Compressor speed may be determined via a speed sensor or it may be inferred via voltage and current supplied to operate compressor 60. Method 800 proceeds to 806 after compressor speed is determined.

At 806, method 800 determines an accumulator inlet pressure correction. The pressure correction between the interior heat exchanger outlet and the accumulator inlet is based on heat pump compressor speed. In particular, a table of empirically determined pressure correction values based on compressor speed is indexed by compressor speed and the table outputs a pressure correction value. Method 800 proceeds to 808 after the accumulator inlet pressure correction is determined.

At 808, method 800 determines accumulator inlet pressure. In one example, the accumulator inlet pressure is determined by subtracting the accumulator inlet pressure correction determined at 806 from the interior heat exchanger outlet pressure determined at 802. Method 800 proceeds to 810 after the accumulator inlet pressure is determined.

At 810, method 800 determines a heat pump compressor inlet pressure or suction pressure correction. In one example, the heat pump compressor 60 is positioned in the climate control system 24 as shown in FIGS. 2-4B. The pressure correction between the accumulator inlet and the heat pump compressor inlet accumulator input is based on heat pump compressor speed. In particular, a table of empirically determined pressure correction values based on compressor speed is indexed by compressor speed and the table outputs a pressure correction value for the heat pump compressor inlet. Method 800 proceeds to 812 after the heat pump compressor inlet pressure correction is determined.

At 812, method 800 determines heat pump compressor inlet pressure. In one example, the heat pump compressor inlet pressure is determined by subtracting the heat pump compressor inlet pressure correction from the accumulator inlet pressure determined at 808. Method 800 proceeds to 814 after the heat pump compressor inlet pressure is determined.

At 814, method 800 determines outlet pressure at an outlet of the heat pump compressor. In one example, a pressure sensor is positioned at the heat pump compressor outlet and the pressure sensor supplies a signal to a controller that determines pressure at the heat pump compressor outlet based on the signal. Method 800 proceeds to 816 after pressure at the heat pump compressor outlet is determined.

At 816, method 800 determines a heat pump compressor pressure ratio. The heat pump compressor pressure ratio is determined by dividing the heat pump compressor outlet pressure determined at 814 by the compensated heat pump compressor inlet pressure determined at 812. Method 800 proceeds to 818 after the heat pump compressor pressure ratio is determined.

At 818, method 800 determines a heat pump compressor speed adjustment from the heat pump pressure ratio. The compressor speed may be determined as is described in FIGS. 5 and 9. Method 800 proceeds to 820 after the heat pump compressor speed adjustment is determined.

At 820, method 800 adjusts the heat pump compressor speed. The heat pump compressor speed may be increased via increasing a voltage frequency and/or increasing an amount of electrical current or voltage supplied to the heat pump compressor via a controller. The heat pump compressor speed may be decreased via decreasing a voltage frequency and/or decreasing an amount of electrical current or voltage supplied to the heat pump compressor via a controller. Further, the heat pump compressor speed may be closed-loop controlled based on a measured heat pump compressor speed. Method 800 proceeds to exit after heat pump compressor speed is adjusted.

In this way, the heat pump compressor pressure ratio may be estimated based on interior heat exchanger outlet temperature. If the pressure ratio is greater than is desired, the compressor speed may be reduced to increase refrigerant and lubricant flow through the heat pump compressor.

Figure 9:
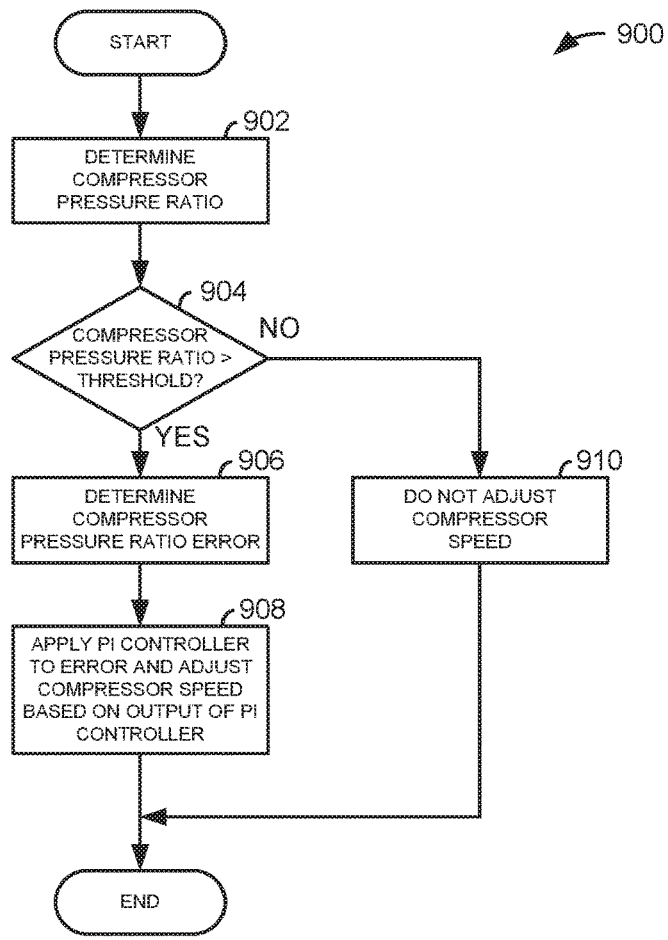
FIG. 9 shows a method for adjusting speed of a heat pump compressor.

Referring now to FIG. 9, a method for adjusting heat pump compressor speed responsive to heat pump compressor pressure ratio is shown. The method of FIG. 9 may operate in cooperation with the methods of FIGS. 5-8 to operate a heat pump compressor. At least portions of the method of FIG. 9 may be included as executable instructions stored in non-transitory memory of the system shown in FIGS. 1-4B. Further, portions of the method of FIG. 9 may be performed in the physical world to transform operating states of one or more devices.

At 902, method 900 determines a pressure ratio across a heat pump compressor. In one example, pressure sensors may sense inlet and outlet pressures of the heat pump compressor. In other examples, heat pump compressor outlet pressure may be determined via a pressure sensor and heat pump compressor inlet pressure may be estimated as described in FIGS. 6-8. The pressure ratio may be determined via dividing the heat pump outlet pressure by the heat pump inlet pressure. Method 900 proceeds to 904 after the heat pump compressor ratio is determined.

At 904, method 900 judges if the heat pump compressor ratio is greater than a threshold. The threshold pressure ratio may be empirically determined and stored to memory. If method 900 judges that the heat pump compressor ratio is greater than the threshold, the answer is yes and method 900 proceeds to 806. Otherwise, the answer is no and method 900 proceeds to 910.

At 910, method 900 provides a heat pump compressor speed adjustment value of zero so that heat pump compressor speed is not adjusted responsive to the heat pump compressor pressure ratio. For example, at lower pressure ratios (e.g., 10:1) it may be expected that refrigerant and lubricant flow through the compressor is sufficient to lubricate the heat pump compressor. Therefore, compressor speed is not adjusted and the adjustment value is zero. However, at higher pressure ratios (e.g., 20:1) it may be expected that refrigerant and lubricant flow though the compressor is less than is desired. Therefore, the compressor speed is adjusted to a lower speed so that the heat pump compressor may operate at a speed where lubricant flow at the present heat pump compressor pressure ratio may be sufficient to reduce the possibility of heat pump compressor degradation. Method 900 proceeds to exit after the heat pump compressor speed is not adjusted.

At 906, method 900 determines a heat pump compressor pressure ratio error. In one example, the heat pump compressor pressure ratio determined at 902 is subtracted from a desired heat pump compressor pressure ratio that may be empirically determined. The result is the heat pump compressor pressure ratio error. Method 900 proceeds to 908 after the heat pump compressor pressure ratio error is determined.

At 908, method 900 operates on the heat pump compressor pressure ratio error with a proportional/integral controller. Thus, method 900 provides a heat pump compressor pressure ratio proportional/integral controller that has different proportional and integral gains than the compressor head pressure proportional/integral controller described at 512. The proportional and integral gains may be empirically determined and stored in controller memory. The proportional controller may be described via the following equations:

$$\text{Speed\_adj} = (P \cdot e) + (I\text{term})$$

$$I\text{term} = (I \cdot e \cdot t) + I\text{term\_prev}$$

where Speed_adj is the heat pump compressor speed adjustment, P is a proportional gain, e is the heat pump compressor pressure ratio error, Iterm is the integral correction, I is the integral gain, Iterm_prev is the previous value of the integral correction, and t is the controller loop time.

The heat pump compressor speed is adjusted to a new value based on the value of Speed_adj. The compressor speed may be decreased if the pressure ratio increases (e.g., increases from 15:1 to 18:1). The heat pump compressor speed is adjusted via adjusting voltage and current supplied to the heat pump compressor. Method 900 proceeds to exit after heat pump compressor speed is adjusted.

Thus, the methods of FIGS. 5-9 provide for a vehicle climate control method, comprising: inferring a pressure at an inlet of a heat pump compressor from a pressure at an outlet of a heat exchanger via a controller; and adjusting speed of a heat pump compressor in response to a pressure ratio across the heat pump compressor via a controller, the pressure ratio based on the inferred pressure at the inlet of the heat pump compressor. The vehicle climate control method includes where the heat exchanger is a battery chiller heat exchanger. The vehicle climate control method includes where the heat exchanger is a vehicle cabin or interior heat exchanger. The vehicle climate control method includes where the heat exchanger is an exterior heat exchanger. The vehicle climate control method further comprises adjusting speed of the heat pump compressor in response to output of a proportional/integral controller that provides an output only when pressure at an outlet of the heat pump compressor is greater than a threshold pressure. The vehicle climate control method includes where the inferring of the pressure at the inlet of the heat pump occurs when a heat pump is operated in a heating mode or a dehumidification mode.

As will be appreciated by one of ordinary skill in the art, methods described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other system hardware.

This concludes the description. The reading of it by those skilled in the art would bring to mind many alterations and modifications without departing from the spirit and the scope of the description. For example, the systems and methods described herein may be applied to full electric vehicles and vehicles that include an engine and an electric motor for propulsion.

The invention claimed is:

1. A vehicle climate control method, comprising:
   via a controller, inferring a pressure at an inlet of a heat pump compressor from a suction pressure correction and a pressure at an outlet of a battery chiller heat exchanger including subtracting an accumulator inlet compensation pressure from the pressure at the outlet of the battery chiller heat exchanger, and where the accumulator inlet compensation pressure is based on a speed of the heat pump compressor;
   adjusting the speed of the heat pump compressor in response to a pressure ratio across the heat pump compressor via the controller in a first mode while an outside heat exchanger is operating as an evaporator, the pressure ratio based on the inferred pressure at the inlet of the heat pump compressor.

2. The vehicle climate control method of claim 1, further comprising subtracting a heat pump compressor inlet pressure correction from an accumulator inlet pressure to infer the pressure at the inlet of the heat pump compressor.

3. The vehicle climate control method of claim 2, where the heat pump compressor inlet pressure correction is based on the speed of the heat pump compressor.

4. The vehicle climate control method of claim 1, further comprising heating a passenger compartment of a vehicle via a refrigerant that heats coolant circulating in a coolant loop that includes an engine, the refrigerant included in a refrigerant loop that includes the heat pump compressor.

5. The vehicle climate control method of claim 1, further comprising providing a heat pump compressor speed adjustment in response to output of a proportional and integral controller when the heat pump compressor pressure ratio is greater than a threshold pressure ratio, and not providing the heat pump compressor speed adjustment in response to output of the proportional and integral controller when the heat pump pressure ratio is less than the threshold pressure ratio.

6. The vehicle climate control method of claim 1, where the inferring of the pressure at the inlet of the heat pump compressor occurs when a heat pump that includes the heat pump compressor is operated in a heating mode or a dehumidification mode.

7. The vehicle climate control method of claim 1, further comprising adjusting the speed of the heat pump compressor in a second mode via the controller responsive to a pressure at an outlet of the heat pump compressor and not the pressure at the inlet of the heat pump compressor.

8. The vehicle climate control method of claim 7, where adjusting speed of the heat pump compressor includes adjusting the heat pump compressor speed via two proportional and integral controllers.

9. The vehicle climate control method of claim 8, where a first of the two proportional and integral controllers adjusts the speed of the heat pump compressor responsive to a temperature and where a second of the two proportional and integral controllers adjusts the speed of the heat pump compressor to reduce head pressure of the heat pump compressor.

10. A vehicle climate control method, comprising:
via a controller, inferring a pressure at an inlet of a heat pump compressor from a pressure at an outlet of an exterior heat exchanger including subtracting an accumulator compensation pressure from the pressure at the outlet of the exterior heat exchanger to determine an accumulator inlet pressure, where the accumulator compensation pressure is based on a speed of the heat pump compressor, and subtracting a pressure correction for the inlet of the heat pump compressor from the accumulator inlet pressure; and
adjusting the speed of the heat pump compressor in response to a pressure ratio across the heat pump compressor via the controller while the exterior heat exchanger is operating as an evaporator, the pressure ratio based on the inferred pressure at the inlet of the heat pump compressor.

11. The vehicle climate control method of claim 10, further comprising heating a passenger compartment of a vehicle via a refrigerant that heats coolant circulating in a coolant loop that includes an engine, the refrigerant included in a refrigerant loop that includes the heat pump compressor.

* * * * *